(12) United States Patent  (10) Patent No.: US 7,522,394 B2
Khorram  (45) Date of Patent: Apr. 21, 2009

(54) RADIO FREQUENCY INTEGRATED CIRCUIT HAVING SECTIONAL ESD PROTECTION

(75) Inventor: Shahla Khorram, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 175 days.

(21) Appl. No.: 10/645,027

(22) Filed: Aug. 21, 2003

(65) Prior Publication Data

US 2005/0041347 A1  Feb. 24, 2005

(51) Int. Cl.
*H02H 9/00* (2006.01)
(52) U.S. Cl. ........................................................ 361/56
(58) Field of Classification Search ..................... 361/56
See application file for complete search history.

(56) References Cited

U.S. PATENT DOCUMENTS

| | | | | |
|---|---|---|---|---|
| 5,564,420 A * | 10/1996 | Nazarian et al. | ............. | 600/407 |
| 5,574,986 A * | 11/1996 | Mobach | ........................ | 455/76 |
| 5,646,434 A * | 7/1997 | Chrysostomides et al. | .. | 257/355 |
| 5,901,023 A * | 5/1999 | Tsuji | ............................. | 361/56 |
| 6,445,039 B1 * | 9/2002 | Woo et al. | ..................... | 257/355 |
| 6,597,227 B1 * | 7/2003 | Yue et al. | ..................... | 327/310 |
| 6,624,999 B1 * | 9/2003 | Johnson | ........................ | 361/113 |
| 6,825,764 B2 * | 11/2004 | Capobianco et al. | ... | 340/539.23 |
| 2001/0002202 A1 * | 5/2001 | Feher | ........................... | 375/130 |
| 2003/0058591 A1 * | 3/2003 | Johnson | ........................ | 361/56 |
| 2003/0183403 A1 * | 10/2003 | Kluge et al. | ............... | 174/35 R |

* cited by examiner

*Primary Examiner*—Stephen W Jackson
*Assistant Examiner*—Ann T Hoang
(74) *Attorney, Agent, or Firm*—Garlick Harrison & Markison; Timothy W. Markison

(57) ABSTRACT

A radio frequency integrated circuit (RFIC) having sectional electrostatic discharge (ESD) protection includes an analog receive section, an analog transmit section, a digital section, a first inductor assembly and a second inductor assembly. The analog receive section is operably coupled to convert inbound RF signals into inbound low IF signals and includes an analog receive ground connection. The analog transmit section is operably coupled to convert outbound low IF signals into outbound RF signals and includes an analog transmit ground connection. The digital section is operably coupled to convert the inbound low IF signals into inbound digital baseband signals and to convert outbound digital baseband signals into the outbound low IF signals, wherein the digital section has a digital ground connection. The first inductor assembly operably couples the analog receive ground connection to the digital ground connection. The second inductor assembly operably couples the analog transmit ground connection to the digital ground connection.

20 Claims, 8 Drawing Sheets

RADIO FREQUENCY INTEGRATED CIRCUIT HAVING SECTIONAL ESD PROTECTION

BACKGROUND OF THE INVENTION

1. Technical Field of the Invention

This invention relates generally to wireless communications systems and more particularly to wireless communication devices.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies them. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As with any integrated circuit (IC), when a radio transceiver is implemented on an integrated circuit, it must include electro-static discharge (ESD) protection circuitry. As is known, ESD protection circuitry includes reverse coupled diodes between inputs of the IC and ground of the IC, between inputs of the IC and a power supply connection of the IC, between outputs of the IC and ground of the IC, and between outputs of the IC and the power supply connection of the IC. The reverse coupled diodes function to route the energy of an ESD event occurring on an input or an output of the IC to ground and/or to the power supply connection of the IC. Further, many ICs include multiple internal ground connections and multiple power supply connections to provide separate grounds and power supplies to circuits of the IC to minimize power supply coupled noise affecting the circuits. For these types of ICs, the ground connections and power supply connections are made external to the IC. However, to provide ESD protection, the grounds are coupled together via diodes as are the power supply connections.

For inputs and outputs of an IC that carry low frequency signals (e.g., in the tens of MHz or below), the parasitic capacitance of the reverse coupled diodes does not significantly affect the signals. However, as the frequency of the signals on the input and/or output of the IC increases, the parasitic capacitance and other parasitic components of the diodes begin to adversely affect the signal (i.e., cause distortion of the signal and/or cause the ground voltages, from circuit to circuit of the IC, to vary). A radio frequency integrated circuit (i.e., a radio transceiver implemented on an IC) includes high frequency input and output connections for transceiving radio frequency signals (e.g., signals having a frequency in the hundreds of MHz to the tens of GHz). Since these inputs and outputs must have ESD protection, the parasitic components of reverse coupled diodes do adversely affect the RF signals.

Therefore, a need exists for electrostatic discharge (ESD) protection of RF input and output connections of a radio frequency integrated circuit that does not adversely affect RF signals transceived via the RF input and output connections.

BRIEF SUMMARY OF THE INVENTION

The radio frequency integrated circuit (RFIC) having sectional electrostatic discharge (ESD) protection of the present invention substantially meets these needs and others. The RFIC includes an analog receive section, an analog transmit section, a digital section, a first inductor assembly and a second inductor assembly. The analog receive section is operably coupled to convert inbound radio frequency (RF) signals into inbound low intermediate frequency (IF) signals, wherein the analog receive section has an analog receive ground connection, and wherein the analog receive section includes analog receive ESD protection circuitry operably coupled to the analog receive ground connection. The analog transmit section is operably coupled to convert outbound low IF signals into outbound RF signals, wherein the analog transmit section has an analog transmit ground connection, and wherein the analog transmit section includes analog transmit ESD protection circuitry operably coupled to the analog transmit ground connection. The digital section is operably coupled to convert the inbound low IF signals into inbound digital baseband signals and to convert outbound digital baseband signals into the outbound low IF signals, wherein the digital section has a digital ground connection. The first inductor assembly, which may include one or more off-chip inductors, is operably coupling the analog receive ground connection to the digital ground connection. The second inductor assembly, which may include one or more off-chip inductors, is operably coupling the analog transmit ground connection to the digital ground connection.

DETAILED DESCRIPTION OF THE INVENTION

Figure 1:
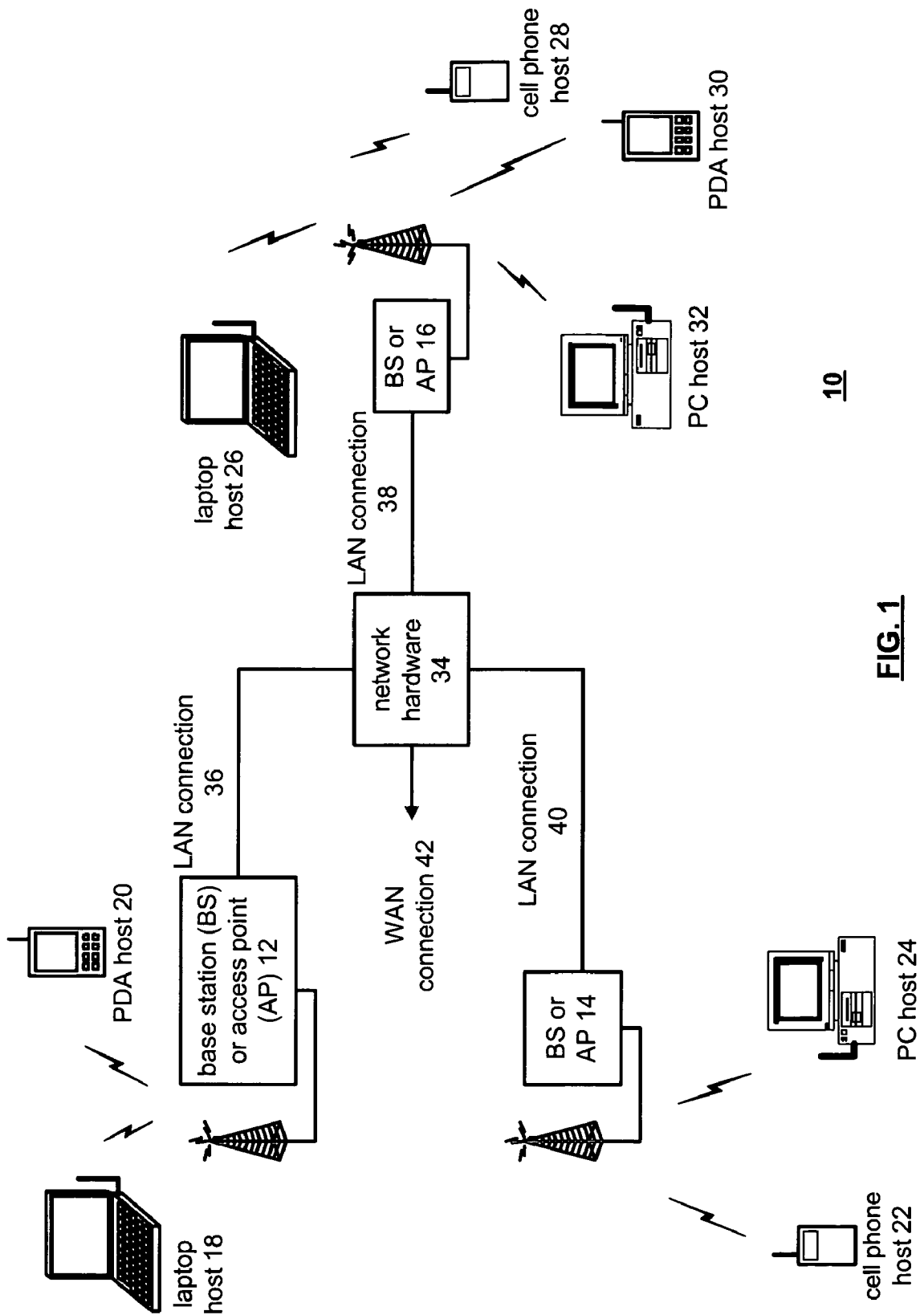
FIG. 1 is a schematic block diagram of a wireless communication system in accordance with the present invention.

FIG. 1 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
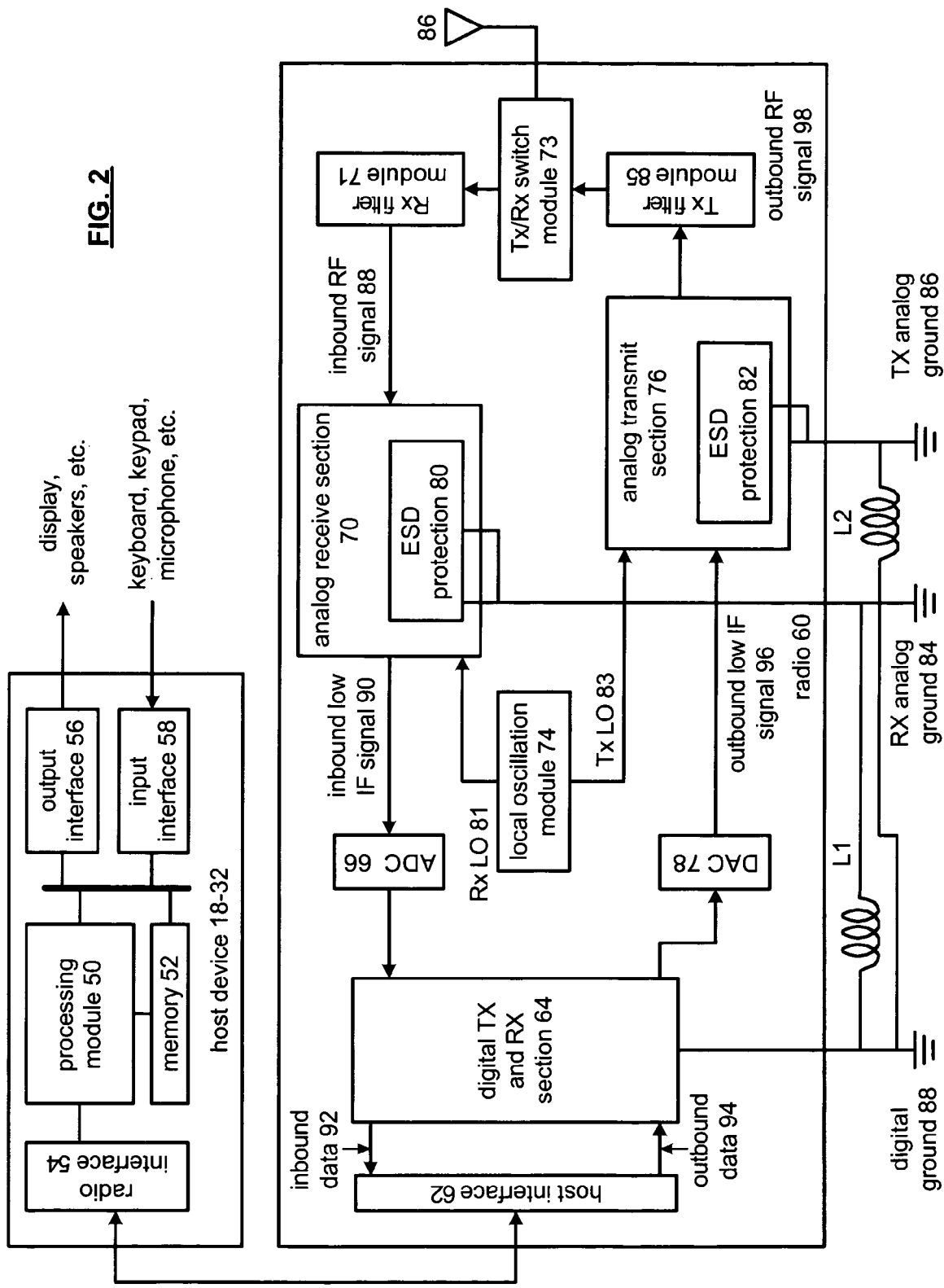
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver and transmitter processing module 64, an analog-to-digital converter 66, an analog receiver section 70, a receiver filter 71, a transmitter/receiver switch 73, a local oscillation module 74, a digital-to-analog converter 78, an analog transmit section 76, a transmitter filter module 85, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver and transmitter processing module 64 perform operational instructions regarding digital receiver functions and digital transmitter functions. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing module 64 may be implemented via a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory (not shown) may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital receive and transmit processing module 64, which processes the outbound data 94 in accordance with a particular wireless communication standard (e.g., IEEE 802.11, Bluetooth, et cetera) to produce digital outbound low IF signals 96. The digital outbound low IF signals 96 have a carrier frequency in the range of zero Hertz (i.e., are baseband signals) to a few megahertz.

The digital-to-analog converter 78 converts the digital outbound low IF signals 96 from the digital domain to the analog domain. The analog transmitter section 76 converts the outbound low IF signals 96 into outbound RF signals 98 based on a transmitter local oscillation 83. The transmitter filter module 85 filters the outbound RF signals 98 prior to transmission by the antenna 86 to a targeted device such as a base station, an access point and/or another wireless communication device.

The analog transmit section 76 includes an electrostatic discharge (ESD) protection circuit 82. The ESD protection circuit 82 may include one or more reverse coupled diodes to a transmit ground 86, one or more transistors coupled to the transmit ground 86, and/or as disclosed in co-pending patent application entitled ESD PROTECTION CIRCUIT FOR HIGH SPEED SIGNALING INCLUDING T/R SWITCHES, having a Ser. No. 10/460,570, and a filing date of Jun. 12, 2003.

The radio 60 also receives inbound RF signals 88 via the antenna 86, which were transmitted by a base station, an access point, or another wireless communication device. The antenna 86 receives the RF signal and couples the RF signal to the receiver filter module 71 through Tx/Rx switch module 73. The receiver filter module 71 sends the inbound RF signal 88 to the analog receive section 70 and the analog receive section 70 converts the inbound RF signals 88 into an inbound low IF signal 90 based on a receiver local oscillation 81. The inbound RF signals 88 may have a carrier frequency of zero Hertz (i.e., are baseband signals) up to a few MHz.

The analog receive section 70 includes an ESD protection circuit 80 that is operably coupled to a receiver analog ground 84. The ESD protection circuit 80 may include one or more reverse coupled diodes to a receive ground 84, one or more transistors coupled to the receive ground 84, and/or as disclosed in co-pending patent application entitled ESD PROTECTION CIRCUIT FOR HIGH SPEED SIGNALING INCLUDING T/R SWITCHES, having a Ser. No. 10/460, 570, and a filing date of Jun. 12, 2003.

The analog-to-digital converter 66 converts the inbound low IF signals 90 from the analog domain to the digital domain. The digital receiver and transmitter processing module 64 decodes, descrambles, demaps, and/or demodulates the digital inbound low IF signals 90 to recapture inbound data 92 in accordance with the particular wireless communication standard being implemented by radio 60. The host interface 62 provides the recaptured inbound data 92 to the host device 18-32 via the radio interface 54.

As illustrated, the radio 60 is essentially divided into three sections: a digital section (e.g., the digital TX and RX section 64 and the digital portions of the DAC 78 and ADC 66), the analog receive section, which may further include the analog portion of the ADC 66, and the analog transmit section, which may further include the analog portion of the DAC 78. Each of these sections includes a separate ground connection: the digital ground 88, the RX analog ground 84, and the TX analog ground 86. As is further shown, inductors L1 and L2 are coupled between the ground connections 84, 86, and 88 to reduce the adverse affects caused by the parasitic capacitance and other parasitic components of the ESD protection circuits 80 and 82 on the inbound RF signals 88 and the outbound RF signals 98. The inductors L1 and L2 are off-chip and have an inductance value to be resonant with the parasitic capacitance of the ESD protection circuits 80 and 82 at the radio frequency to provide, at the radio frequency, a low impedance connection between the separate grounds 84, 86, and 88. For instance, the inductance of L1 and L2 may equal $C/(2\pi f)^2$, where C is the parasitic capacitance and f is the radio frequency. Further, the inductors L1 and L2 may be placed within the IC package housing the radio 60 or external to the IC package on a printed circuit board supporting the IC packet.

As one of average skill in the art will appreciate, the wireless communication device of FIG. 2 may be implemented using one or more integrated circuits. For example, the host device may be implemented on one integrated circuit, the digital receiver and transmitter processing section 64 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing module 64 may be a common processing device implemented on a single integrated circuit.

Figure 3:
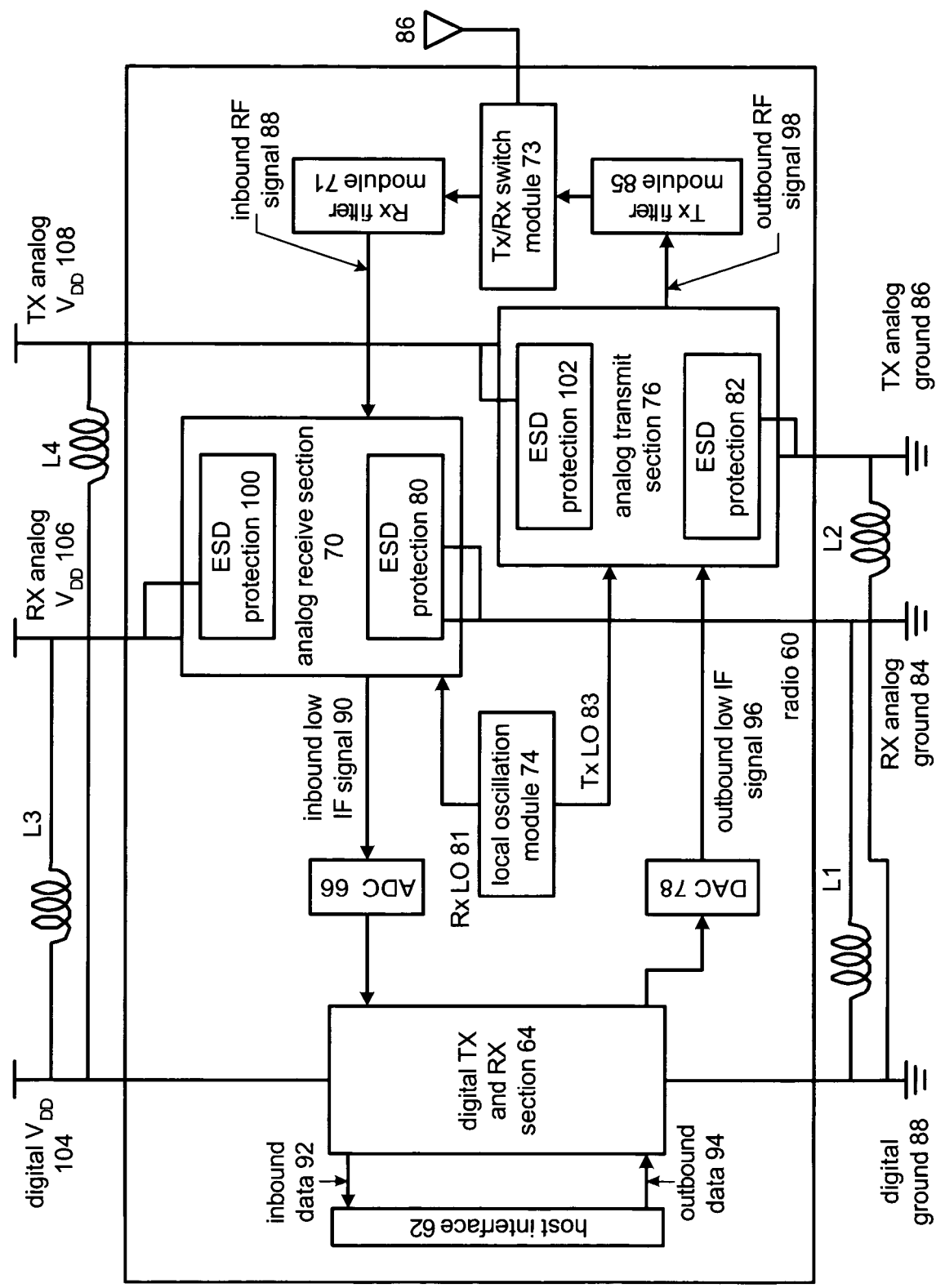
FIG. 3 is a schematic block diagram of a radio frequency integrated circuit including ESD protection in accordance with the present invention.

FIG. 3 is a schematic block diagram of a radio frequency integrated circuit (e.g., radio) 60 including ESD protection circuits 80, 82, 100, and 102 with the analog receive section 70 and the analog transmit section 76. The radio 60 includes a host interface 62, digital receiver and transmitter processing module 64, an analog-to-digital converter 66, an analog receiver section 70, a receiver filter 71, a transmitter/receiver switch 73, a local oscillation module 74, a digital-to-analog converter 78, an analog transmit section 76, a transmitter filter module 85, and an antenna 86. The functionality of these components is as described with reference to FIG. 2.

The radio 60 is further shown to include three separate supply voltage connections: digital $V_{DD}$ 104, RX analog $V_{DD}$ 106, and TX analog $V_{DD}$ 108. The digital VDD 104 is coupled to the digital TX and RX section 64, the RX analog VDD 106 is coupled to the analog receive section 70, and the TX analog VDD 108 is coupled to the analog transmit section 76 to provide a supply voltage to the respective sections. As is further shown, inductors L3 and L4 are coupled between the power supply connections 104, 106, and 108 to reduce the adverse affects caused by the parasitic capacitance and other parasitic components of the ESD protection circuits 100 and 102 on the inbound RF signals 88 and the outbound RF signals 98. The inductors L3 and L4 are off-chip and have an inductance value to resonant with the parasitic capacitance of the ESD protection circuits 100 and 102 at the radio frequency to provide, at the radio frequency, a low impedance connection between the separate power supply connections 104, 106, and 108. For instance, the inductance of L3 and L4 may equal $C/(2\pi f)^2$, where C is the parasitic capacitance and f is the radio frequency. Further, the inductors L3 and L4 may be placed within the IC package housing the radio 60 or external to the IC package on a printed circuit board supporting the IC packet.

Figure 4:
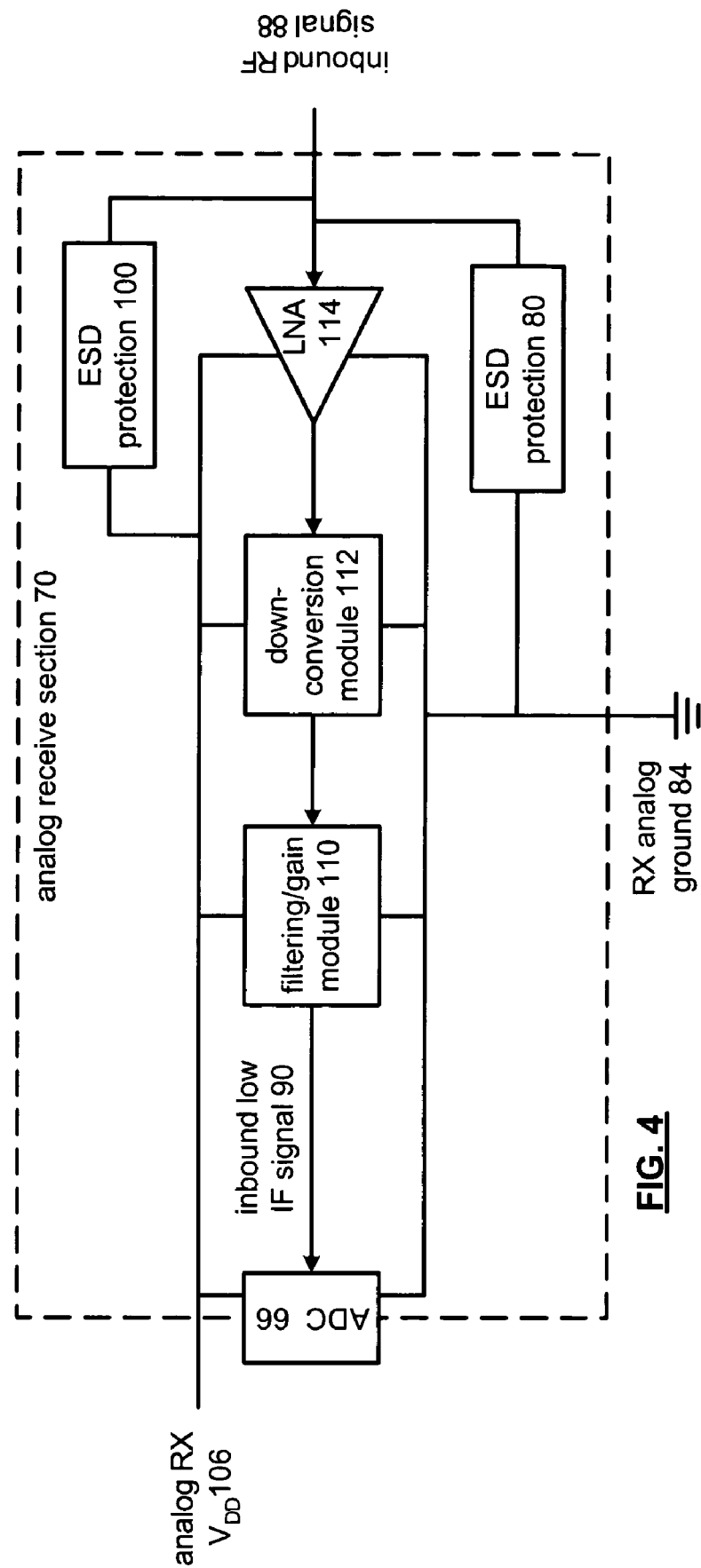
FIG. 4 is a schematic block diagram of an analog receive section in accordance with the present invention.

FIG. 4 is a schematic block diagram of an analog receive section 70 that includes a filtering/attenuation module 110, an IF mixing down conversion stage 112, a low noise amplifier 114, the analog portion of the ADC 66, ESD protection circuit 80, and ESD protection circuit 100. In operation, the Rx filter 71 of the radio 60 provides filtered RF signals to the analog receive section 70 via the low noise amplifier 114, which amplifies the inbound RF signals 88 to produce amplified inbound RF signals. The low noise amplifier 114 provides the amplified inbound RF signals to down-conversion module 112, which converts the amplified inbound RF signals into down-converted signals based on the receiver local oscillation 81 provided by local oscillation module 74. The down conversion module 112 provides the down-converted signals to the filtering/gain module 110. The filtering/gain module 110 filters and/or gains the down-converted signals to produce the inbound low IF signals 90.

As shown, the analog portion of the ADC 66, the filter/gain module 110, the down-conversion module 112, and the LNA 114 share a common ground (e.g., RX analog ground 84) and a common power supply connection (e.g., RX $V_{DD}$ 106). In this embodiment, the ESD protection circuits 80 and 100 are coupled to the common ground and power supply connections and to the input of the LNA 114. In this configuration, ESD protection is provided for the inbound RF signals 88. The ground and the supply voltage connections of the analog receive section are coupled to the other ground and supply voltages of the RFIC via inductors, which reduces the adverse affects of the ESD protection circuits 80 and 100 on the inbound RF signals 88.

Figure 5:
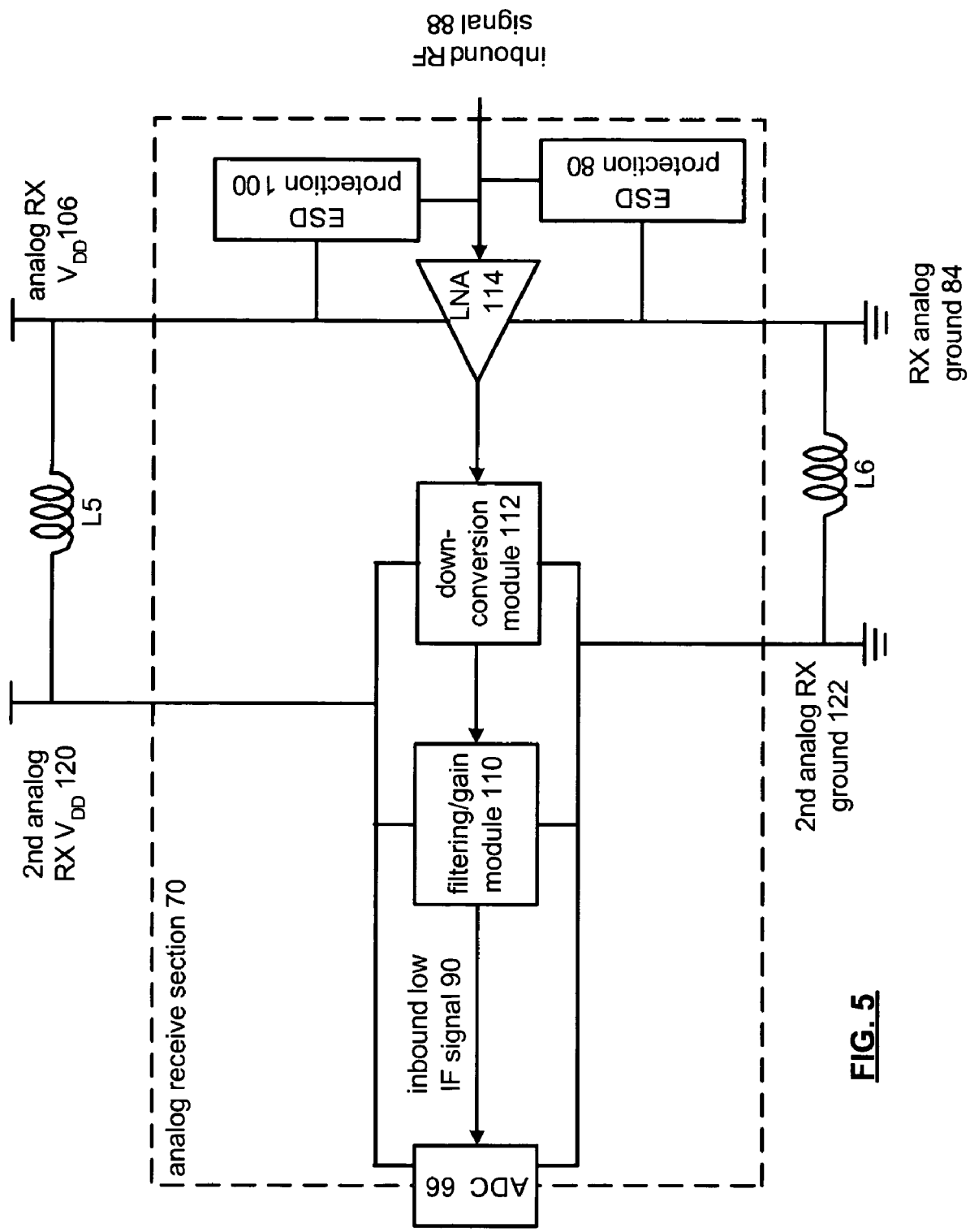
FIG. 5 is a schematic block diagram of another analog receive section in accordance with the present invention.

FIG. 5 is a schematic block diagram of another analog receive section 70 that includes a filtering/attenuation module 110, an IF mixing down conversion stage 112, a low noise amplifier 114, the analog portion of the ADC 66, ESD protection circuit 80, and ESD protection circuit 100. In operation, the Rx filter 71 of the radio 60 provides filtered RF signals to the analog receive section 70 via the low noise amplifier 114, which amplifies the inbound RF signals 88 to produce amplified inbound RF signals. The low noise amplifier 114 provides the amplified inbound RF signals to down-conversion module 112, which converts the amplified inbound RF signals into down-converted signals based on the receiver local oscillation 81 provided by local oscillation module 74. The down conversion module 112 provides the down-converted signals to the filtering/gain module 110. The filtering/gain module 110 filters and/or gains the down-converted signals to produce the inbound low IF signals 90.

In this embodiment, the LNA 114 includes a separate ground (e.g., RX ground 84) from the ground (e.g., $2^{nd}$ analog RX ground 122) used by the other components (e.g., the down conversion module 112, the filtering/gain module 110, and the ADC 66). The LNA 114 also includes a separate supply voltage (e.g., analog RX $V_{DD}$ 106) from the supply voltage (e.g., $2^{nd}$ analog RX $V_{DD}$ 120) used by the other components. The separate grounds 84 and 122 may be externally coupled via inductor L6 and the separate supply voltage connection may be externally coupled via inductor L5 to provide further attenuation and isolation of the adverse affects of the parasitics of the ESD protection circuits without affecting other sections of the radio IC 60.

Figure 6:
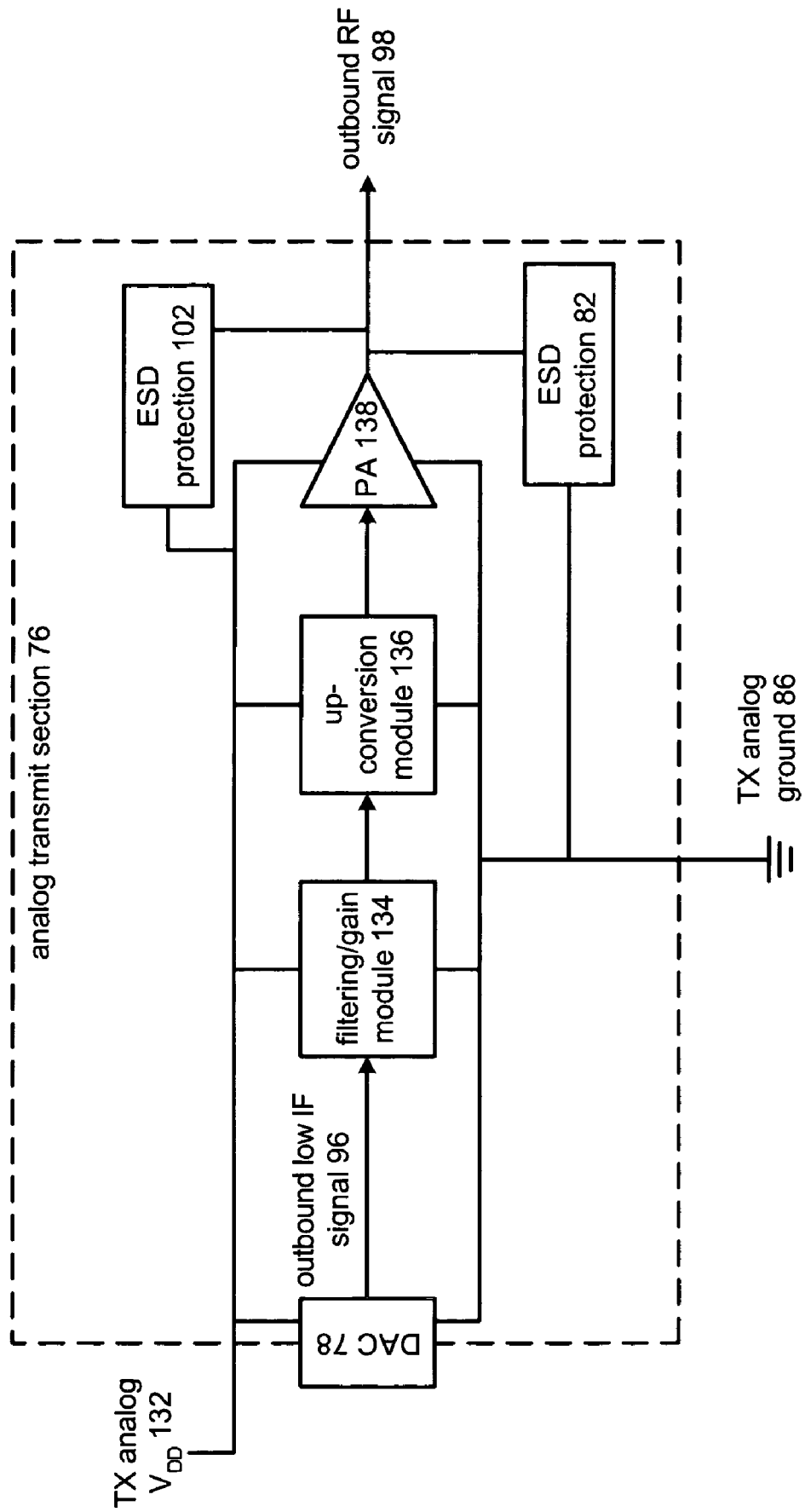
FIG. 6 is a schematic block diagram of an analog transmit section in accordance with the present invention.

FIG. 6 is a schematic block diagram of an analog transmit section 76 that includes the analog portion of the DAC 78, a filtering/gain module 134, an IF mixing up conversion stage 136, and a power amplifier 138. In operation, the filtering/ gain module 134 filters and/or adjusts the gain of the analog outbound low IF signals prior to providing it to the IF up-conversion mixing stage 136. The IF up-conversion mixing stage 136 converts the analog low IF signals into RF signals based on a transmitter local oscillation 83 provided by local oscillation module 74. The power amplifier 138 amplifies the RF signals to produce the outbound RF signals 98, which are filtered by the transmitter filter module 85 prior to transmission by the antenna 86.

As shown, the analog portion of the DAC 78, the filtering/ gain module 134, the up-conversion module 136, and the power amplifier 138 share a ground connection (e.g., the TX analog ground 86) and share a supply voltage connection (e.g., TX analog $V_{DD}$ 132). The ESD protection circuits 82 and 102 provide ESD protection for the outbound RF signals 98.

Figure 7:
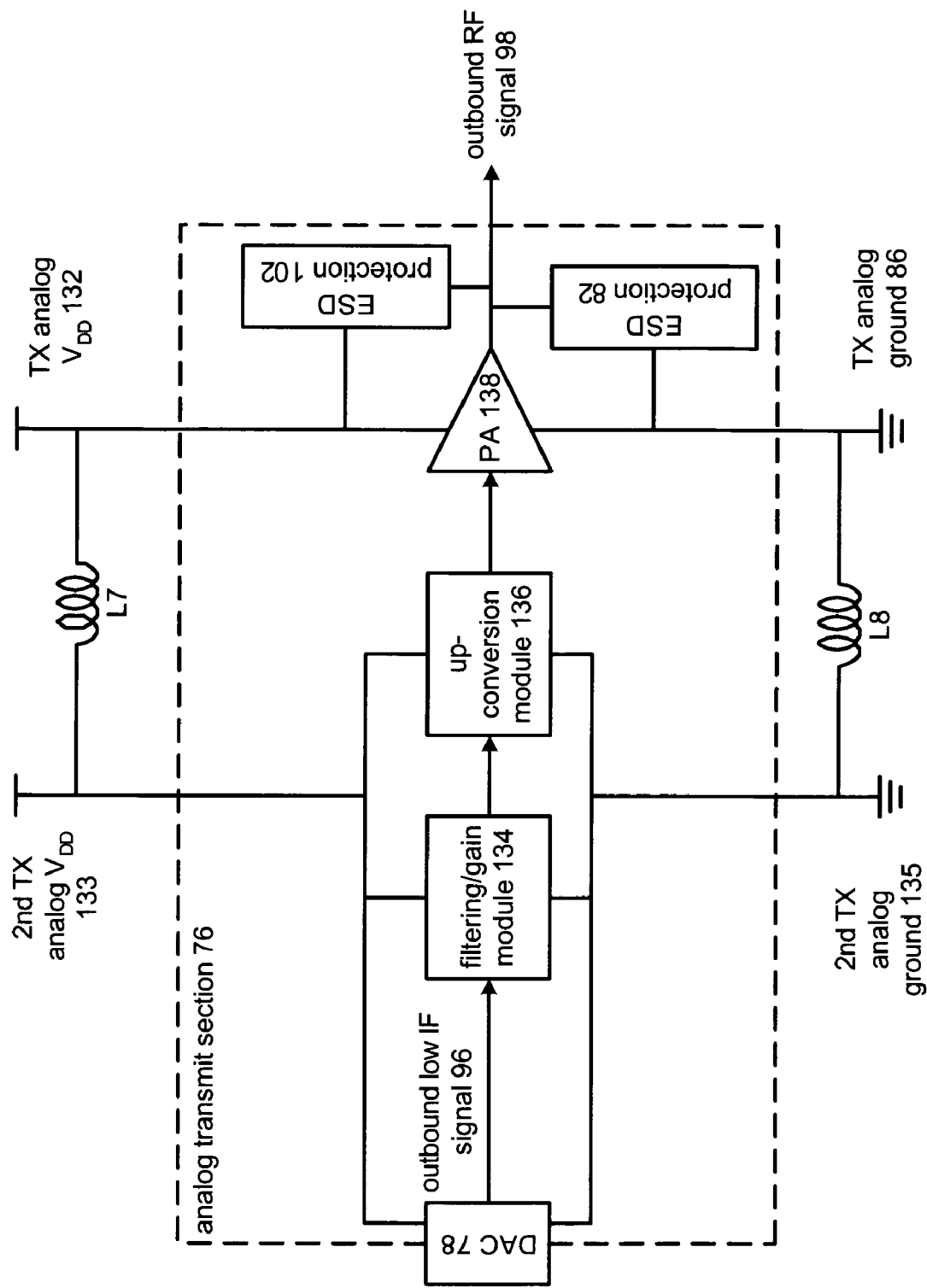
FIG. 7 is a schematic block diagram of another analog transmit section in accordance with the present invention.

FIG. 7 is a schematic block diagram of another analog transmit section 76 that includes the analog portion of the DAC 78, a filtering/gain module 134, an IF mixing up conversion stage 136, and a power amplifier 138. In operation, the filtering/gain module 134 filters and/or adjusts the gain of the analog outbound low IF signals prior to providing it to the IF up-conversion mixing stage 136. The IF up-conversion mixing stage 136 converts the analog low IF signals into RF signals based on a transmitter local oscillation 83 provided by local oscillation module 74. The power amplifier 138 amplifies the RF signals to produce the outbound RF signals 98, which are filtered by the transmitter filter module 85 prior to transmission by the antenna 86.

In this embodiment, the power amplifier 138 has a separate ground (e.g., TX analog ground 86) and a separate supply voltage connection (e.g., TX analog VDD 132) from the ground connection (e.g., $2^{nd}$ TX analog ground 135) and the supply voltage connection (e.g., $2^{nd}$ TX analog VDD 133) used by the remaining components of the analog transmit section 76 (e.g., the analog portion of the DAC 78, the filtering/gain module 134, and the up-conversion module 136). The separate grounds 86 and 135 may be externally coupled via inductor L8 and the separate supply voltage connection may be externally coupled via inductor L7 to provide further attenuation and isolation of the adverse affects of the parasitics of the ESD protection circuits without affecting other sections of the radio IC 60.

Figure 8:
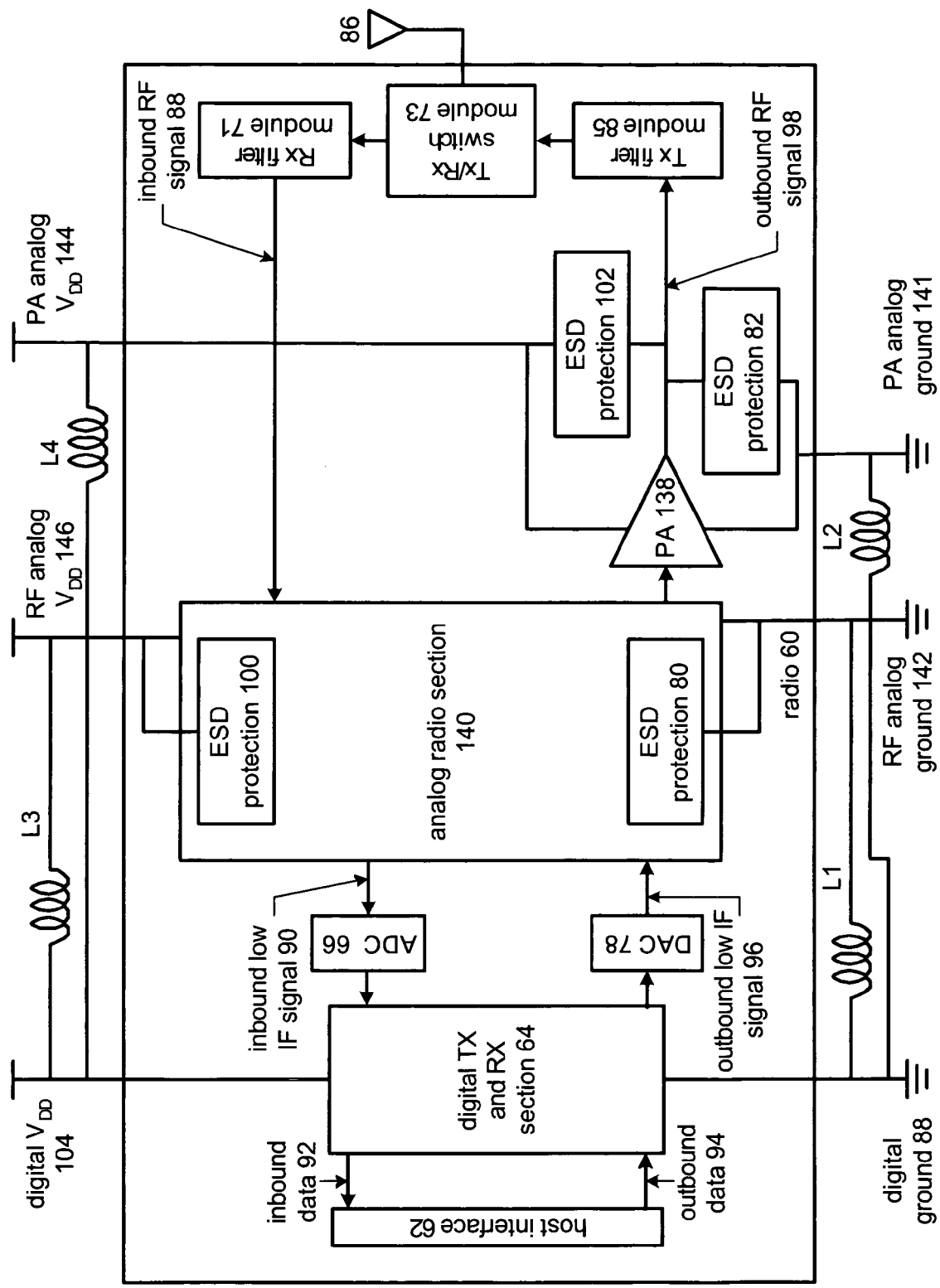
FIG. 8 is a schematic block diagram of another radio frequency integrated circuit in accordance with the present invention.

FIG. 8 is a schematic block diagram of another radio frequency integrated circuit 60 that includes a host interface 62, digital receiver and transmitter processing module 64, an analog-to-digital converter 66, an analog radio section 140, a receiver filter 71, a transmitter/receiver switch 73, a digital-to-analog converter 78, a power amplifier 138, ESD protection circuit 82, ESD protection circuit 102, a transmitter filter module 85, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

In this embodiment, the analog radio section 140 is operably coupled to convert inbound RF signals 88 into the inbound low IF signals 90 and to convert outbound low IF signals 96 into radio frequency signals. The power amplifier 138 amplifies the radio frequency signals to produce the outbound RF signals 98. As is shown, the power amplifier 138 has a separate ground connection (e.g., PA analog ground 141) from the analog radio section 140 (e.g., RF analog ground 142) and the digital ground 88. The power amplifier 138 also includes a separate power supply connection (e.g., PA analog $V_{DD}$ 114) from the power supply connection of the analog radio section 140 (e.g., RF analog $V_{DD}$ 146) and the digital $V_{DD}$ 104. To reduce the adverse affects of the parasitics of the ESD protection circuits 82 and 102 on the outbound RF signals 98 and from adversely affecting the other ground connections 88 and 142 and power supply connections 104 and 146, inductors L1-L4 are coupled therebetween.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a RFIC having sectional ESD protection that substantially reduces the adverse affects of the ESD protection circuitry and does so without having to couple the ESD protection circuitry to the RF signal input and outputs of the RFIC. As one of average skill in the art will appreciate, other embodiments may be derived from the teachings of the present invention without deviating from the scope of the claims.

What is claimed is:

1. A radio frequency integrated circuit (RFIC) having sectional electrostatic discharge (ESD) protection, the RFIC comprises:
   analog receive section operably coupled to convert inbound radio frequency (RF) signals into inbound low intermediate frequency (IF) signals, wherein the analog receive section has an analog receive ground connection, and wherein the analog receive section includes analog receive ESD protection circuitry operably coupled to the analog receive ground connection;
   analog transmit section operably coupled to convert outbound low IF signals into outbound RF signals, wherein the analog transmit section has an analog transmit ground connection, wherein the analog transmit section includes analog transmit ESD protection circuitry operably coupled to the analog transmit ground connection;
   digital section operably coupled to convert the inbound low IF signals into inbound digital data and to convert outbound digital data into the outbound low IF signals, wherein the digital section has a digital ground connection;
   first inductor assembly coupling the analog receive ground connection to the digital ground connection, wherein the first inductor assembly has an inductance value that, at a frequency of the inbound RF signals, resonates with parasitic capacitance of the analog receive ESD protection circuitry to provide a low impedance connection at the frequency of the inbound RF signals; and
   second inductor assembly coupling the analog transmit ground connection to the digital ground connection, wherein the second inductor assembly has an inductance value that, at a frequency of the outbound RF signals, resonates with parasitic capacitance of the analog transmit ESD protection circuitry to provide a low impedance connection at the frequency of the outbound RF signals.

2. The RFIC of claim 1 further comprises:
   the analog receive section, the analog transmit section, and the digital section being fabricated on a single die; and
   the first and second inductor assemblies are off-chip with respect to the single die.

3. The RFIC of claim 2 further comprises at least one of:
   the first and second inductor assemblies are external to a package housing the single die; and
   the first and second inductor assemblies are within the package housing the single die.

4. The RFIC of claim 1 further comprises:
   the analog receive section including second analog receive ESD protection circuitry operably coupled to an analog receive power source connection;
   the analog transmit section including second analog transmit ESD protection circuitry operably coupled to an analog transmit power source connection;
   the digital section including a digital power source connection;
   a third inductor assembly operably coupling the analog receive power source connection to the digital power source connection to reduce adverse affects caused by parasitic capacitance of the second analog receive ESD protection circuitry; and
   a fourth inductor assembly operably coupling the analog transmit power source connection to the digital power source connection to reduce adverse affects caused by parasitic capacitance of the second analog transmit ESD protection circuitry.

5. The RFIC of claim 1, wherein the analog receive section further comprises:
   low noise amplifier operably coupled to amplify the inbound RF signals to produce amplifier inbound RF signals, wherein the low noise amplifier has a low noise amplifier ground connection;
   mixing module operably coupled to mix the amplified inbound RF signals with a receive local oscillation to produce down converted signals, wherein the mixing module has a mixing module ground connection;
   receive filtering module operably coupled to filter the down converted signals to produce the inbound low IF signals, wherein the receive filtering module has a receive filtering ground connection; and
   analog portion of an analog to digital converter, wherein the analog portion has an analog portion ground connection, wherein the first inductor assembly includes a first inductor operably coupling the low noise amplifier ground connection to the mixing module ground connection, a second inductor operably coupling the mixing module ground connection to the receive filtering ground connection, a third inductor operably coupling the receive filtering ground connection to the analog portion ground connection, and a fourth inductor operably coupling the analog portion ground connection to the digital ground connection.

6. The RFIC of claim 1, wherein the analog transmit section further comprises:
   power amplifier operably coupled to amplify up converted signals to produce the outbound RF signals, wherein the power amplifier includes a power amplifier ground connection;
   mixing module operably coupled to mix filtered low IF signals with a transmit local oscillation to produce the up converted signals, wherein the mixing module includes a mixing module ground connection;

filtering module operably coupled to filter the outbound low IF signals to produce the filtered low IF signals, wherein the filtering module includes a filtering module ground connection; and analog portion of a digital to analog converter, wherein the digital to analog converter converts digital outbound low IF signals into the outbound low IF signals, wherein the analog portion of the digital to analog converter includes an analog portion ground connection, wherein the second inductor assembly includes a first inductor operably coupling the power amplifier ground connection to the mixing module ground connection, a second inductor operably coupling the mixing module ground connection to the filtering module ground connection, a third inductor operably coupling the filtering module ground connection to the analog portion ground connection, and a fourth inductor operably coupling the analog portion ground connection to the digital ground connection.

7. The RFIC of claim 1, wherein the analog receive section further comprises:

low noise amplifier operably coupled to amplify the inbound RF signals to produce amplifier inbound RF signals, wherein the low noise amplifier has a low noise amplifier ground connection; and analog receive radio section operably coupled to convert the amplified inbound RF signals into the inbound low IF signals, wherein the analog receive radio section has an analog portion ground connection, wherein the first inductor assembly includes a first inductor operably coupling the low noise amplifier ground connection to the analog portion ground connection and a second inductor operably coupling the analog portion ground connection to the digital ground connection.

8. The RFIC of claim 1, wherein the analog transmit section further comprises:

power amplifier operably coupled to amplify up converted signals to produce the outbound RF signals, wherein the power amplifier includes a power amplifier ground connection; and analog transmit radio section operably coupled to produce the up converted signals from the outbound low IF signals, wherein the analog transmit radio section includes a analog portion ground connection, wherein the second inductor assembly includes a first inductor operably coupling the power amplifier ground connection to the analog portion ground connection and a second inductor operably coupling the analog portion ground connection to the digital ground connection.

9. A radio frequency integrated circuit (RFIC) having sectional electrostatic discharge (ESD) protection, the RFIC comprises:

analog receive section operably coupled to convert inbound radio frequency (RF) signals into inbound low intermediate frequency (IF) signals, wherein the analog receive section has an analog receive ground connection, and wherein the analog receive section includes analog receive ESD protection circuitry operably coupled to the analog receive ground connection;

power amplifier operably coupled to amplify up converted signals to produce outbound RF signals, wherein the power amplifier includes a power amplifier ground connection and power amplifier ESD protection circuitry;

analog transmit radio section operably coupled to produce the up converted signals from outbound low IF signals, wherein the analog transmit radio section includes a analog transmit radio ground connection;

digital section operably coupled to convert the inbound low IF signals into inbound digital data and to convert outbound digital data into the outbound low IF signals, wherein the digital section has a digital ground connection;

inductor operably coupling the power amplifier ground connection to the analog transmit radio ground connection;

first inductor assembly coupling the analog receive ground connection to the digital ground connection, wherein the first inductor assembly has an inductance value that, at a frequency of the inbound RF signals, resonates with parasitic capacitance of the analog receive ESD protection circuitry to provide a low impedance connection at the frequency of the inbound RF signals; and second inductor assembly coupling the analog transmit radio ground connection to the digital ground connection, wherein the second inductor assembly has an inductance value that, at a frequency of the outbound RF signals, resonates with parasitic capacitance of the power amplifier ESD protection circuitry to provide a low impedance connection at the frequency of the outbound RF signals.

10. The RFIC of claim 9 further comprises:

the analog receive section, the power amplifier, the analog transmit radio section, and the digital section being fabricated on a single die; and the inductor and the first and second inductor assemblies are off-chip with respect to the single die.

11. The RFIC of claim 10 further comprises at least one of:

the inductor and the first and second inductor assemblies are external to a package housing the single die; and the inductor and the first and second inductor assemblies are within the package housing the single die.

12. The RFIC of claim 9 further comprises:

the analog receive section including second analog receive ESD protection circuitry operably coupled to an analog receive power source connection;

the power amplifier including second power amplifier ESD protection circuitry operably coupled to a power amplifier power source connection;

the digital section including a digital power source connection;

a third inductor assembly operably coupling the analog receive power source connection to the digital power source connection to reduce adverse affects caused by parasitic capacitance of the second analog receive ESD protection circuitry; and a fourth inductor assembly operably coupling the power amplifier power source connection to the digital power source connection to reduce adverse affects caused by parasitic capacitance of the second power amplifier ESD protection circuitry.

13. The RFIC of claim 9, wherein the analog receive section further comprises:

low noise amplifier operably coupled to amplify the inbound RF signals to produce amplifier inbound RF signals, wherein the low noise amplifier has a low noise amplifier ground connection;

mixing module operably coupled to mix the amplified inbound RF signals with a receive local oscillation to produce down converted signals, wherein the mixing module has a mixing module ground connection;

receive filtering module operably coupled to filter the down converted signals to produce the inbound low IF signals, wherein the receive filtering module has a receive filtering ground connection; and analog portion of an analog to digital converter, wherein the analog portion has an analog portion ground connection, wherein the first inductor assembly includes a first inductor operably coupling the low noise amplifier ground connection to the mixing module ground connection, a second inductor operably coupling the mixing module ground connection to the receive filtering ground connection, a third inductor operably coupling the receive ground connection to the analog portion ground connection, and fourth inductor operably coupling the analog portion ground connection to the digital ground connection.

14. The RFIC of claim 9, wherein the analog transmit radio section further comprises:

mixing module operably coupled to mix filtered low IF signals with a transmit local oscillation to produce the up converted signals, wherein the mixing module includes a mixing module ground connection;

filtering module operably coupled to filter the outbound low IF signals to produce the filtered low IF signals, wherein the filtering module includes a filtering module ground connection; and analog portion of a digital to analog converter, wherein the digital to analog converter converts digital outbound low IF signals into the outbound low IF signals, wherein the analog portion of the digital to analog converter includes an analog portion ground connection, wherein the second inductor assembly includes a first inductor operably coupling the mixing module ground connection to the filtering module ground connection, a second inductor operably coupling the filtering module ground connection to the analog portion ground connection, and a third inductor operably coupling the analog portion ground connection to the digital ground connection.

15. The RFIC of claim 9, wherein the analog receive section further comprises:

low noise amplifier operably coupled to amplify the inbound RF signals to produce amplifier inbound RF signals, wherein the low noise amplifier has a low noise amplifier ground connection; and analog receive radio section operably coupled to convert the amplified inbound RF signals into the inbound low IF signals, wherein the analog receive radio section has an analog portion ground connection, wherein the first inductor assembly includes a first inductor operably coupling the low noise amplifier ground connection to the analog portion ground connection and a second inductor operably coupling the analog portion ground connection to the digital ground connection.

16. A radio frequency integrated circuit (RFIC) having sectional electrostatic discharge (ESD) protection, the RFIC comprises:

power amplifier operably coupled to amplify up converted signals to produce outbound RF signals, wherein the power amplifier includes a power amplifier ground connection and power amplifier ESD protection circuitry;

analog radio section operably coupled to convert inbound radio frequency (RF) signals into inbound low intermediate frequency (IF) signals and operably coupled to produce the up converted signals from outbound low IF signals, wherein the analog radio section has an analog radio ground connection, and wherein the analog radio section includes analog ESD protection circuitry operably coupled to the analog radio ground connection;

digital section operably coupled to convert the inbound low IF signals into inbound digital data and to convert outbound digital data into the outbound low IF signals, wherein the digital section has a digital ground connection;

inductor operably coupling the power amplifier ground connection to the analog radio ground connection; and inductor assembly coupling the analog radio ground connection to the digital ground connection, wherein the inductor assembly has an inductance value that, at a frequency of the inbound RF signals, resonates with parasitic capacitance of the analog ESD protection circuitry to provide a low impedance connection at the frequency of the inbound RF signals.

17. The RFIC of claim 16 further comprises:

the analog radio section, the power amplifier, and the digital section being fabricated on a single die; and the inductor and the inductor assembly are off-chip with respect to the single die.

18. The RFIC of claim 17 further comprises at least one of:

the inductor and the inductor assembly are external to a package housing the single die; and the inductor and the inductor assembly are within the package housing the single die.

19. The RFIC of claim 16 further comprises:

the analog radio section including second analog radio ESD protection circuitry operably coupled to an analog radio power source connection;

the power amplifier including second power amplifier ESD protection circuitry operably coupled to a power amplifier power source connection;

the digital section including a digital power source connection;

a second inductor assembly operably coupling the analog radio power source connection to the digital power source connection to reduce adverse affects caused by parasitic capacitance of the second analog radio ESD protection circuitry; and a third inductor assembly operably coupling the power amplifier power source connection to the digital power source connection to reduce adverse affects caused by parasitic capacitance of the power amplifier ESD protection circuitry.

20. The RFIC of claim 16, wherein the analog radio section further comprises:

low noise amplifier operably coupled to amplify the inbound RF signals to produce amplifier inbound RF signals, wherein the low noise amplifier has a low noise amplifier ground connection;

receive mixing module operably coupled to mix the amplified inbound RF signals with a receive local oscillation to produce down converted signals, wherein the mixing module has a mixing module ground connection;

receive filtering module operably coupled to filter the down converted signals to produce the inbound low IF signals, wherein the receive filtering module has a receive filtering ground connection;

ADC analog portion of an analog to digital converter, wherein the analog portion has an analog portion ground connection, transmit mixing module operably coupled to mix filtered low IF signals with a transmit local oscillation to produce the up converted signals, wherein the mixing module includes a mixing module ground connection;

transmit filtering module operably coupled to filter the outbound low IF signals to produce the filtered low IF signals, wherein the filtering module includes a filtering module ground connection; and DAC analog portion of a digital to analog converter, wherein the digital to analog converter converts digital outbound low IF signals into the outbound low IF signals, wherein the analog portion of the digital to analog converter includes an analog portion ground connection, wherein the inductor assembly includes a first inductor operably coupling the low noise amplifier ground connection to the receive mixing module ground connection, a second inductor operably coupling the receive mixing module ground connection to the receive filtering ground connection, a third inductor operably coupling the receive filtering ground connection to the ADC analog portion ground connection, a fourth inductor operably coupling the ADC analog portion ground connection to the digital ground connection, a fifth inductor operably coupling the transmit mixing module ground connection to the transmit filtering module ground connection, a sixth inductor operably coupling the transmit filtering module ground connection to the DAC analog portion ground connection, and a seventh inductor operably coupling the DAC analog portion ground connection to the digital ground connection.

* * * * *